US009560036B2

(12) United States Patent
Hinton et al.

(10) Patent No.: US 9,560,036 B2
(45) Date of Patent: Jan. 31, 2017

(54) CROSS-PROTOCOL FEDERATED SINGLE SIGN-ON (F-SSO) FOR CLOUD ENABLEMENT

(75) Inventors: Heather M. Hinton, Austin, TX (US); Steven A. Bade, Apex, TX (US); Jeb Linton, Manassas, VA (US); Peter Rodriguez, Pleasanton, CA (US)

(73) Assignee: International Business Machines Corporation, Armonk, NY (US)

( * ) Notice: Subject to any disclaimer, the term of this patent is extended or adjusted under 35 U.S.C. 154(b) by 1711 days.

(21) Appl. No.: 12/832,307

(22) Filed: Jul. 8, 2010

(65) Prior Publication Data
US 2012/0011578 A1    Jan. 12, 2012

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| H04L 9/32 | (2006.01) |

(52) U.S. Cl.
CPC ......... H04L 63/0815 (2013.01); H04L 9/3228 (2013.01)

(58) Field of Classification Search
CPC ............................ H04L 63/0815; H04L 9/3228
USPC ................................................ 726/2, 3, 5, 8
See application file for complete search history.

(56) References Cited

U.S. PATENT DOCUMENTS 7,296,290 B2 * 11/2007 Barriga et al. .................... 726/8
7,603,555 B2 * 10/2009 Schmidt et al. ............. 713/168
7,631,346 B2    12/2009 Hinton et al.
7,657,639 B2    2/2010 Hinton et al.
(Continued)

FOREIGN PATENT DOCUMENTS

| CN | 1640175 A | 7/2005 |
|---|---|---|
| CN | 1725680 A | 1/2006 |

(Continued)

OTHER PUBLICATIONS

He-et al.; "Design and Implementation of SAML2-Based Singel Sign-On Server FAAS"; DIALOG/CSA; vol. 29, No. 22, pp. 5671-5674; Nov. 2008.

(Continued)

Primary Examiner — Tae Kim
(74) Attorney, Agent, or Firm — Richard A. Wilhelm; David H. Judson; Jeffrey S. LaBaw (57) ABSTRACT

A method to enable access to resources hosted in a compute cloud begins upon receiving a registration request to initiate a user's registration to use resources hosted in the compute cloud. During a registration process initiated by receipt of the registration request, a federated single sign-on (F-SSO) request is received. The F-SSO request includes an assertion (e.g., an HTTP-based SAML assertion) having authentication data (e.g., an SSH public key, a CIFS username, etc.) for use to enable direct user access to a resource hosted in the compute cloud. Upon validation of the assertion, the authentication data is deployed within the cloud to enable direct user access to the compute cloud resource using the authentication data. In this manner, the cloud provider provides authentication, single sign-on and lifecycle management for the user, despite the "air gap" between the HTTP protocol used for F-SSO and the non-HTTP protocol used for the user's direct access to the cloud resource.

33 Claims, 6 Drawing Sheets

(56) References Cited

U.S. PATENT DOCUMENTS

| | | |
|---|---|---|
| 2003/0149781 A1 | 8/2003 | Yared et al. |
| 2003/0172090 A1* | 9/2003 | Asunmaa et al. ............ 707/200 |
| 2004/0128392 A1* | 7/2004 | Blakley et al. .............. 709/229 |
| 2004/0139319 A1 | 7/2004 | Favazza et al. |
| 2005/0063377 A1* | 3/2005 | Bryant et al. ................ 370/389 |
| 2006/0020679 A1* | 1/2006 | Hinton et al. ............... 709/217 |
| 2006/0048216 A1* | 3/2006 | Hinton et al. .................... 726/8 |
| 2006/0075224 A1* | 4/2006 | Tao .............................. 713/164 |
| 2006/0117104 A1* | 6/2006 | Taniguchi et al. ........... 709/225 |
| 2007/0245013 A1* | 10/2007 | Saraswathy et al. ........ 709/223 |
| 2008/0002696 A1 | 1/2008 | Claessens et al. |
| 2008/0059804 A1* | 3/2008 | Shah et al. ................... 713/186 |
| 2008/0127320 A1* | 5/2008 | De Lutiis et al. ................ 726/9 |
| 2009/0063665 A1* | 3/2009 | Bagepalli et al. ............ 709/222 |
| 2009/0064287 A1* | 3/2009 | Bagepalli et al. ................ 726/4 |
| 2009/0064300 A1* | 3/2009 | Bagepalli et al. ................ 726/7 |
| 2009/0249439 A1* | 10/2009 | Olden et al. ..................... 726/1 |
| 2009/0249440 A1* | 10/2009 | Platt et al. ....................... 726/1 |

FOREIGN PATENT DOCUMENTS

| | | |
|---|---|---|
| CN | 101102257 A | 1/2006 |
| CN | 101064717 A | 10/2007 |

OTHER PUBLICATIONS

Navarro-et al.; "TeraGrid's Integrated Information Service"; ACM Digital Library; Nov. 2009.
Gomi, H.; "User-Centric Identity Governance Across Domain Boundaries"; ACM Digital Library; pp. 35-47; Nov. 2009.
OASIS: "Security Assertion Markup Language (SAML) V2.0 Technical Overview", Internet Citation, Mar. 25, 2008, pp. 1-51, XP002578461.
International Search Report, PCT/EP2011/061015, Nov. 17, 2011.
"Security Assertion Markup Language (SAML) V2.0", Technical Overview, Section 5, Committee Draft 02, Mar. 25, 2008.

* cited by examiner

CROSS-PROTOCOL FEDERATED SINGLE SIGN-ON (F-SSO) FOR CLOUD ENABLEMENT

BACKGROUND OF THE INVENTION

Technical Field

This disclosure relates generally to management of user sessions in a federated environment.

Background of the Related Art

User authentication is one function that service providers offer to ensure that users accessing resources (e.g., applications, web content, etc.) are authorized to do so. To ensure that a user is not an imposter, service providers (e.g., web servers) generally ask for a user's username and password to prove identity before authorizing access to resources. Single sign-on (SSO) is an access control mechanism which enables a user to authenticate once (e.g., provide a username and password) and gain access to software resources across multiple systems. Typically, an SSO system enables user access to resources within an enterprise or an organization. Federated Single Sign-on (F-SSO) extends the concept of single sign-on across multiple enterprises, thus establishing partnerships between different organizations and enterprises. F-SSO systems typically include application level protocols that allow one enterprise (e.g., an identity provider) to supply a user's identity and other attributes to another enterprise (e.g., a service provider). In other words, an F-SSO system helps transport the user's credentials from the identity provider to the service provider using any suitable protocol. Typically, current F-SSO techniques use HTTP as the transport protocol.

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. While this is highly desirable, the application itself may have data transfer and storage requirements that use other non-HTTP-based protocols. Thus, while most of the interactions with the application may occur over HTTP and are easily bound to the user, often the key interactions (involving data) must take place over legacy protocols yet still require the same "user binding." The need to support both HTTP-based and non HTTP-based protocols complicates the provisioning and use of the application in the cloud environment. This problem is further exacerbated by the fact that single sign-on requirements (for the application) may require support for other lower level protocols, such as CIFS, NFS, SSH, Telnet, and the like, as well as the co-existence of SSO across multiple protocols.

Current approaches to authentication in the cloud, however, are insufficient. Thus, for example, where the SSH network protocol is used to log into a remote machine and execute commands, the state-of-the-art involves either providing direct (back-proxy) links to a customer's LDAP (or its equivalent) directory for authentication with a user name and password (U/P), or providing for the explicit distribution to users of SSH key pairs. Each approach, however, has significant drawbacks. Direct connections from a cloud provider to a customer's LDAP may not be allowed, even for simple LDAP bind requests. Distribution of SSH key pairs is not a scalable approach for on-boarding to the cloud of a large number of users. There are similar deficiencies in prior art approaches for other protocols such as CIFS, NFS, and the like.

BRIEF SUMMARY

This disclosure describes a method to enable a user who has registered to a cloud over an (application-level) HTTP protocol to access resources using a non-HTTP protocol, including network-level protocols such as SSH, while still allowing the advantages of application-level F-SSO protocols, including lifecycle management.

For protocols where key pairs are used for authentication (e.g., SSH), F-SSO functionality is used to enable the exchange of key pairs, thus enabling an overall trust relationship between a customer and a cloud provider. Thus, a customer's end users may be authorized (or not) by the customer and have their overall lifecycle management maintained by the customer while still having a simple on-boarding process to the cloud environment. For protocols where a U/P is collected at the cloud provider side and then verified against the customer LDAP, F-SSO functionality is used to establish the user as a "bona fide" user, optionally to help collect a password for the user, and then to complete the U/P validation at the customer side (e.g., using F-SSO with a secure message exchange protocol such as WS-Trust). This allows the customer to retain control of the user's lifecycle and to manage attributes for use at the cloud provider site.

In one embodiment, a method to manage access to resources hosted in a shared pool of configurable computing resources (e.g., a compute cloud) begins upon receiving a registration request to initiate a user's registration to use resources hosted in the compute cloud. During a registration process initiated by receipt of the registration request, a federated single sign-on (F-SSO) request is received. The F-SSO request includes an assertion (e.g., an HTTP-based SAML assertion) having (additional) authentication data (e.g., an SSH public key, a CIFS username, etc.) for use to enable direct user access to a resource hosted in the compute cloud. Upon validation of the assertion, the authentication data is deployed or provisioned within the cloud to enable direct user access to the compute cloud resource using the authentication data. In this manner, a cloud tenant (e.g., the cloud provider's customer) provides lifecycle management for the user, and a cloud provider uses a single protocol (e.g., HTTP-based) single sign-on approach across multiple transport protocols despite the "air gap" between the application-level HTTP protocol used for F-SSO and the non-HTTP protocol used for the user's direct access to the cloud resource.

In an alternative embodiment, the above-described method is performed in an apparatus comprising a processor, and computer memory holding computer program instructions that when executed by the processor perform the method.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
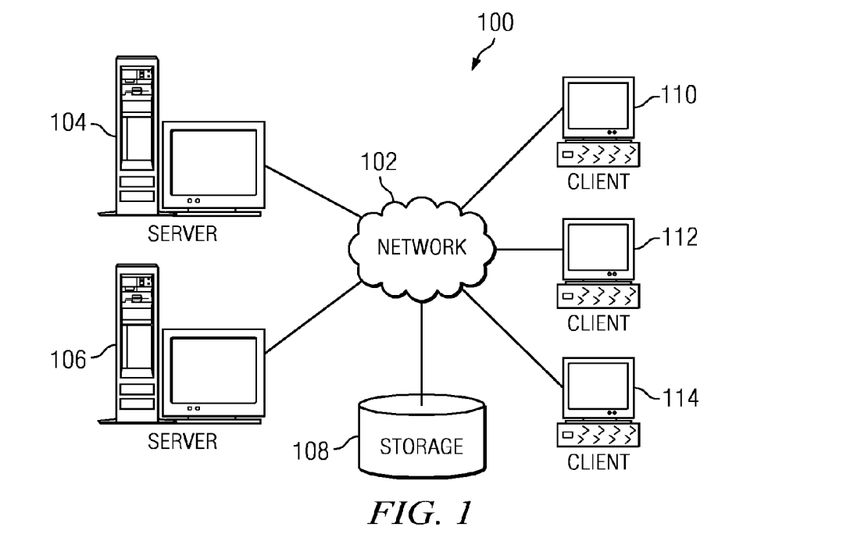
FIG. 1 depicts an exemplary block diagram of a distributed data processing environment in which exemplary aspects of the illustrative embodiments may be implemented.
Figure 2:
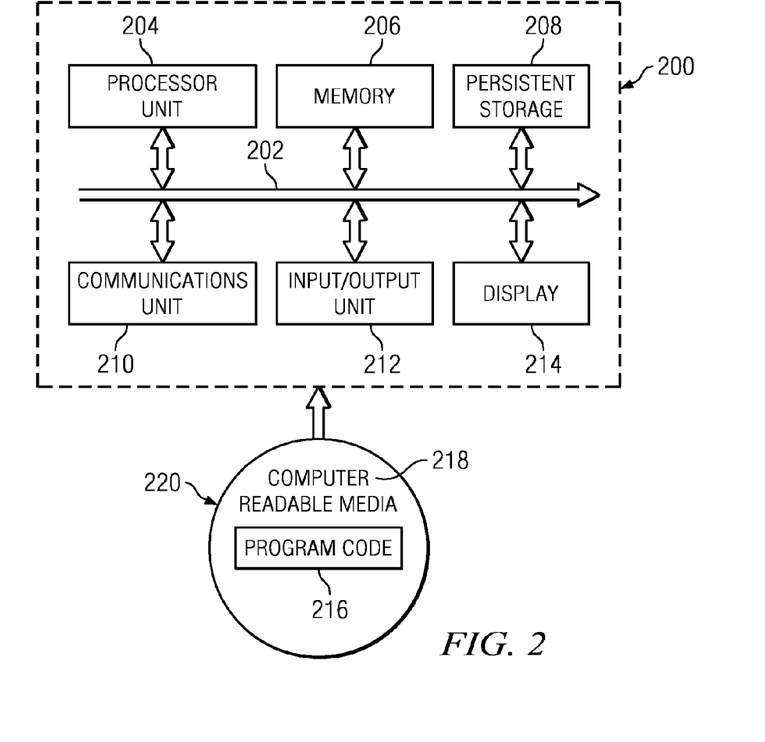
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, as used herein an "assertion" provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service. As is known in the art, a Security Assertion Markup Language (SAML) assertion is an example of a possible assertion format that may be used with the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows.

The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Figure 3:
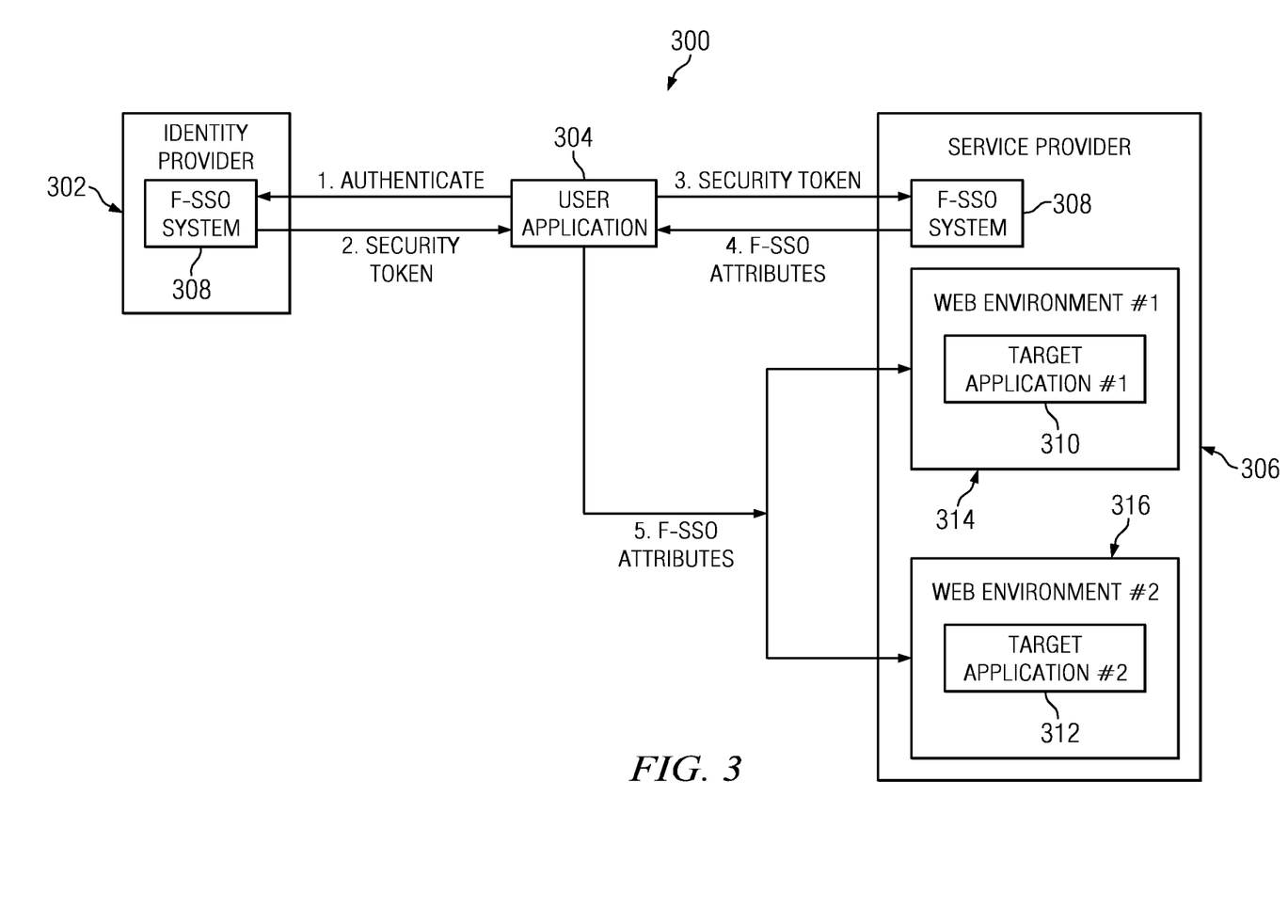
FIG. 3 illustrates a known federated single sign-on (F-SSO) operation.

Single sign-on (SSO) is an access control mechanism which enables a user to authenticate once (e.g., by providing a user name and password) and gain access to software resources across multiple systems. Typically, an SSO system enables user access to resources within an enterprise or an organization. Federated single sign-on (F-SSO) extends the concept of single sign-on across multiple enterprises, thus establishing partnerships among different organizations and enterprises. F-SSO systems typically include protocols, such as SAML, that allow one enterprise (e.g., an identity provider) to supply a user's identity and other attributes to another enterprise (e.g., a service provider). In other words, an F-SSO system helps transport the user's credentials from the identity provider to the service provider in a trusted manner using a suitable protocol, typically HTTP. FIG. 3 is a block diagram illustrating the typical flow of operations in a known federated single sign-on (F-SSO) process. As shown in FIG. 3, the F-SSO process 300 involves communications between an identity provider 302, a user application 304, and a service provider 306. The identity provider 302 and the service provider 304 include an F-SSO system 308, which includes logic to authenticate a user, establish the user's credentials, and generate an encrypted security token (e.g., cookie) including user information. Additionally, the service provider 306 can also include one or more target applications 310 and 312. The target applications can reside within the same web environment or be a part of different web environments 314 and 316 (e.g., Apache, WebSphere® etc.) within the same service provider 306. The user application 304 can include logic (e.g., a web browser) to present content (e.g., web pages) to the user.

In one embodiment, the user application 304 first authenticates to the identity provider 302 (e.g., providing a username and password) as indicated by step 1. In step 2, the identity provider's F-SSO system 308 returns a security token to the user. This security token may be time-sensitive (e.g., can include a time stamp) and cryptographically signed. The security token can include the user's identity (e.g., username) and other attributes (e.g., user identification number) that the identity provider 302 wishes to provide to the service provider 306. The user application 304 can present the security token to the service provider's F-SSO system using any suitable technique (e.g., HTTP request) and message structure (e.g., using HTTP query strings, HTTP POST data, etc.) defined by the F-SSO protocol (refer to step 3). In step 4, the service provider's F-SSO system 308 validates the cryptographic signature of the security token to confirm the token's authenticity of origin and that the contents of the security token are trustworthy. The service provider's F-SSO system can also extract the user's identity and related attributes from the security token and generate an F-SSO attributes cookie including the user's identity and attributes.

After achieving single sign-on (i.e., conveying user attributes from the identity provider's F-SSO system to the service provider's F-SSO system), if the user wants to access a target application (e.g., 310) hosted by the service provider 306, the user application 304 may pass an F-SSO attributes cookie obtained from the service provider's F-SSO system 308 to the target application (refer to step 5). In the alternative, attributes may be stored at a proxy and passed as a user's request passes through the proxy so that cookies are not required. In this example embodiment, the transfer of user attributes (e.g., in an F-SSO cookie) is done in a trustworthy and secure manner and can be performed on the basis of F-SSO prescribed protocols (typically HTTP). If the data contained within an F-SSO attributes cookie is accepted and understood by the target application (e.g., if the target application can decrypt and retrieve the cookie's contents), the target application (e.g., e10) validates it and creates a session for the user. In some embodiments, the target applications (e.g., 310) understand the F-SSO attributes cookie, or they can be part of the F-SSO process (i.e., the target application may not include an F-SSO system).

As shown, each target application can be located in a different web environment, with different authentication mechanisms and different requirements. According to the techniques that are to be described below, a target application is located within a cloud-based operating environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 4:
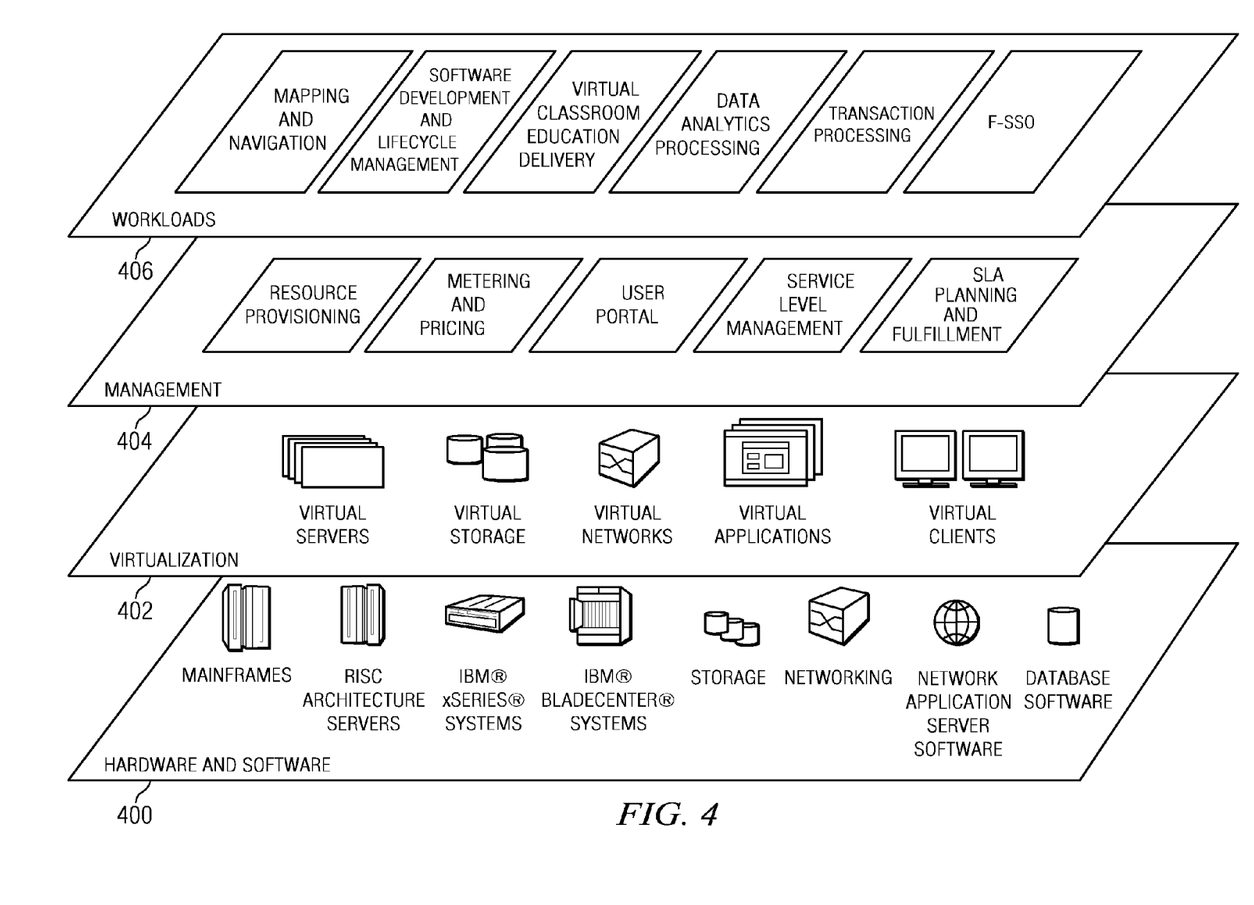
FIG. 4 depicts abstraction model layers of a cloud compute environment according to an embodiment of the invention.

Referring now to FIG. 4, by way of additional background, a set of functional abstraction layers provided by a cloud computing environment is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 402 provides an abstraction layer from which the following examples of virtual entities may be provided: virtual servers; virtual storage; virtual networks, including virtual private networks; virtual applications and operating systems; and virtual clients.

In one example, management layer 404 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 406 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, according to the teachings of this disclosure, cross-protocol federated single sign-on.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide F-SSO to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute the target application 410 that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud.

In the context of this disclosure, it is assumed that authentication to the "target application" that is hosted in the cloud is not password-based but rather requires some other authentication approach (e.g., key-based). The target application is one that may also use transport protocols other than HTTP. There are many file transfer and storage protocols that require support in the cloud environment but that are otherwise not well suited to (or that do not use) HTTP. These include, without limitation, file transfer protocols such as SSH, FTP, and others, and storage protocols such as CIFS, NFS and others. Thus, in the context of this disclosure, it is assumed that the target application is accessed using one or more of these file or storage protocols, and it is desired to enable authentication of a user to the target application within the context of the F-SSO cloud operation. The administration and management of the cloud typically is based on HTTP, although actual use of the cloud service may well be based on some protocol other than HTTP. The disclosed technique thus can leverage HTTP tools and user experience to simplify access to and use of a non-HTTP cloud service, as will be seen.

This advantage is achieved in the manner which is now described by way of several example scenarios.

Figure 5:
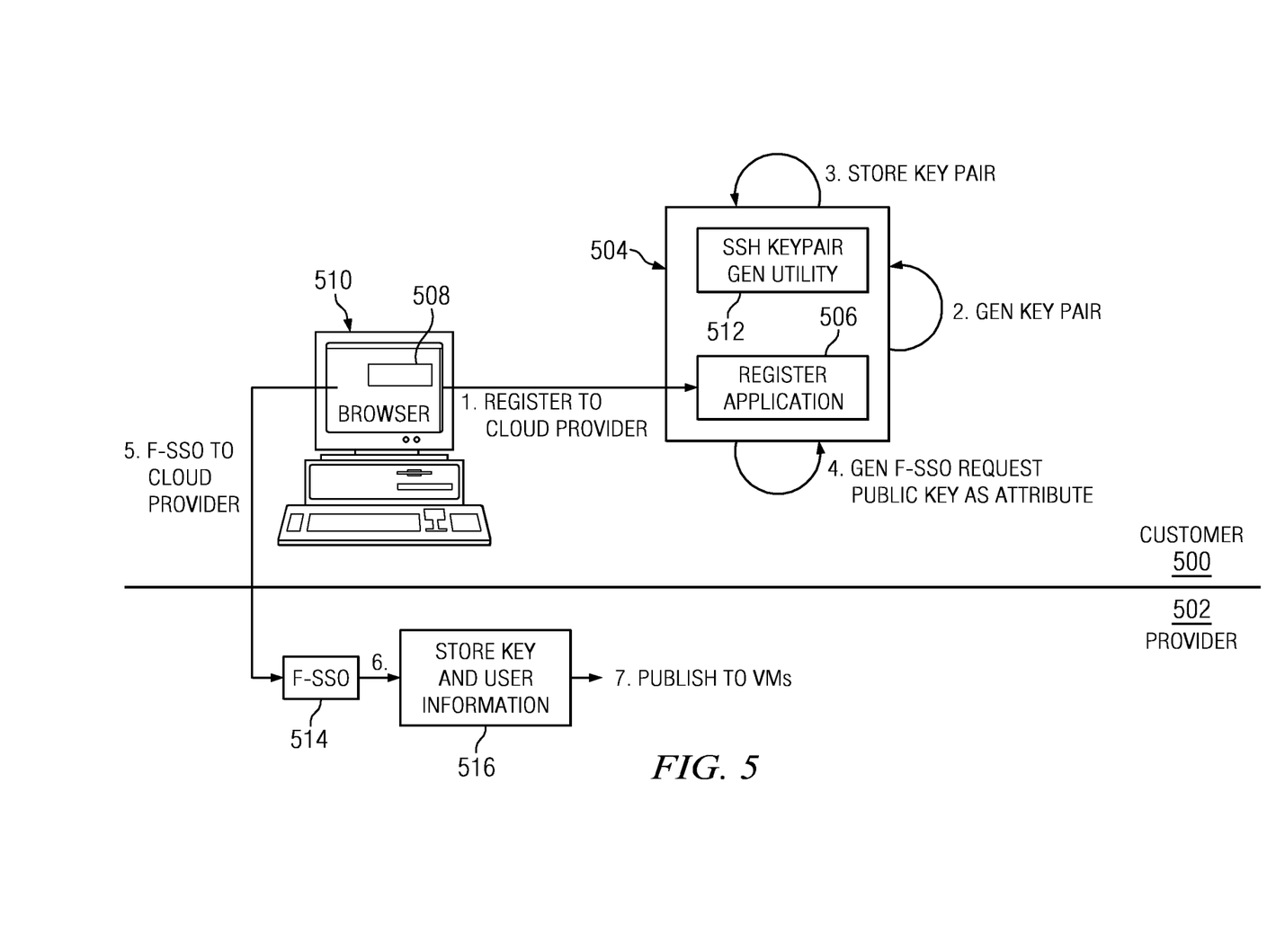
FIG. 5 illustrates how F-SSO can be used according to the teachings to provide cross-protocol F-SSO.

A first embodiment is shown in FIG. 5. In this embodiment, F-SSO (e.g., using SAML) is used to register a user into the cloud and to establish SSH keys for use in later direct SSH access (by the user) to an application executing (in a cloud embodiment) as a virtual machine instance, such as a virtual machine image used for development or test of an application. Of course, SSH is used in this example by way of example only, and the reference to a virtual machine is also non-limiting, as a physical machine also may be covered. As illustrated in FIG. 5, an enterprise 500 (represented by the components above the line) is a "customer" of a cloud provider 502 In this embodiment, the enterprise 500 provides a federated identity provider (IdP) function and, to that end, the enterprise includes one or more systems such as a federated identity manager (e.g., IBM TFIM). The identity manager 504 executes as a server on hardware and software such as described above, or it could be implemented in a virtual machine. The identity manager 504 includes a registration application 506 that provides a cloud registration function using F-SSO. As will be seen, that registration function is augmented according to the teachings herein to provide (a) generation of SSH key pairs (for use in the cloud), and (b) the inclusion of a private key from that pair into an F-SSO SAML assertion. Preferably, the generation of the SSH key pairs occurs as a runtime operation, i.e. while the registration application otherwise registers the user into the cloud provider's environment.

To that end, an end user operates a web browser 508 executing on a user machine 510. At step 1, the end user makes a registration request, which is received by the registration application 506 executing on or in association with the identity manager 504. At step 2, the registration application makes a request to an SSH key pair generation utility 512 to generate an SSH key pair. As is well-known, an SSH key pair comprises a private key, and a public key that is related to the private key by a predetermined mathematical relationship. The key pair generation utility 512 generates the key pair and, at step 3, stores the key pair locally. The key pair is also returned to the registration application 506 which, at step 4, generates an F-SSO assertion. According to the teachings herein, the F-SSO assertion is a SAML assertion that includes the SSH public key as an attribute. The SAML assertion also includes one or more other attributes to be used by the cloud provider 502 to govern the user's actions within the cloud environment, as well as one or more SAML parameters such as "not on or before" or "not on or after" that limit that user's access to the provider or the provider's resources. In this way, the user may be provided access to the cloud provider resources for a given time, or for a given project, etc. The user's private key (from the generated key pair) preferably is returned to the user's machine 510 and optionally a copy is also stored by the registration application.

Continuing with the F-SSO operation, the user's browser 508 is then redirected (e.g., via an HTTP 302 or the like) at step 5 to the cloud provider 502. At the cloud provider 502, the cloud provider 502 validates the SAML assertion using its F-SSO component 514 (as described above with respect to FIG. 3). At step 6, the cloud provider 502 creates a data record about the user in a LDAP (or equivalent) directory 516 and, at step 6, stores the user's public key in that directory for future use by the user. At step 7, the F-SSO component 514 then publishes the public key to one or more deployed virtual or physical machines for authentication purposes to complete the F-SSO process of this disclosure.

Figure 6:
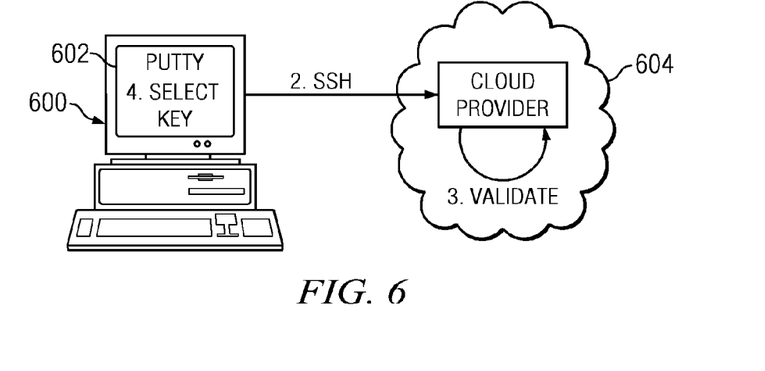
FIG. 6 illustrates how an end user, having established an SSH key pair at the cloud provider using F-SSO, performs an SSH login to a virtual machine image within the cloud provider environment.

Thus, according to the teachings herein, in this embodiment, an end user's SSH key pair is generated during runtime as part of an overall SAML-based F-SSO operation (or other operations, such as a key "re-generate" and then included in future F-SSO, where the new value is updated in the same manner as it was initially added to the user registry). The public key of that key pair is then provided to the cloud as a SAML attribute, all within the F-SSO flow itself. In this way, the technique herein takes advantage of conventional SAML-based F-SSO yet ensures that desired authentication information is provided in advance of the user's actual use of the target application. By having established the SSH key pair at the cloud provider site (in advance, and through the F-SSO SAML processing flow), the end user can later perform a simple SSH authentication and login to the requested virtual machine (running in the cloud provider's environment). This is illustrated in FIG. 6, wherein the end user at machine 600 executes a client-side SSH application 602 (such as PuTTY) to SSH into the target application 604 executing in the cloud provider's virtual machine environment 606. In particular, at step 1 the end user opens the SSH application and selects his or her private key (that was created during the key generation step). An SSH authentication and login to the requested virtual machine is step 2. At step 3, the user is validated. If validation is successful, the user is provided direct access to the target application over the SSH protocol.

Thus, the technique in FIG. 5 (by which the authentication data is pre-generated and passed as an attribute in the F-SSO SAML assertion) enables the later SSH-based authentication to occur seamlessly when it comes time for the end user to access the target application via SSH. In this manner, the technique facilitates a "cross-protocol" F-SSO to facilitate access to the cloud-based resources.

Figure 7:
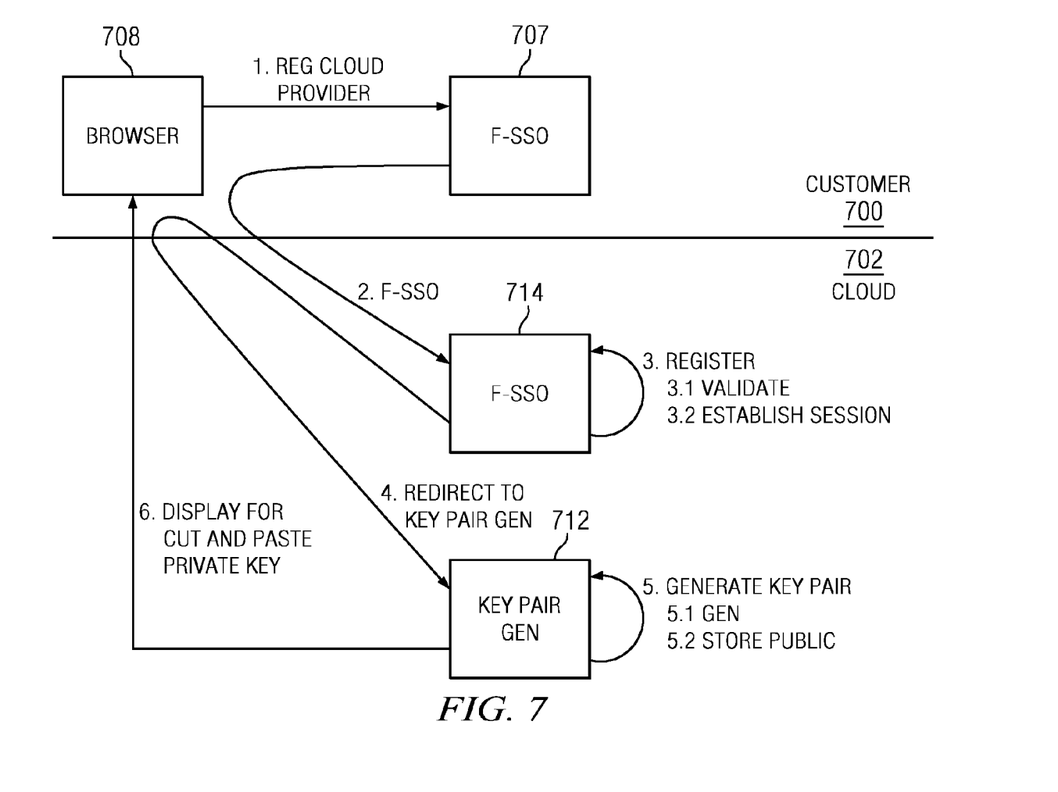
FIG. 7 illustrates an alternative embodiment of FIG. 5 wherein the F-SSO identity provider operation is carried out within the cloud provider's environment.

FIG. 7 illustrates an alternative embodiment to FIG. 5 wherein the registration and key pair generation takes place in the cloud provider 702 instead of within the customer's environment 700. In this example, the user F-SSO's to the cloud provider 702 and has the SSH key pair generated by the cloud provider, such that the private key is stored by the user and not the cloud provider, but the cloud provider still is able to store and publish the public key (as in FIG. 6). In this example, at step 1 the user browser 708 makes a request to register to the cloud provider, which request is by an F-SSO component 707. At step 2, the F-SSO component 707 in the customer's environment redirects the user's browser to the F-SSO component 714 executing in the cloud provider. At step 3, the F-SSO component 714 performs a registration to validate the user and establish a session. This function is carried out by the registration application (not shown). The F-SSO component 714 then issues a redirect to the browser at step 4, which causes the browser to request a key pair from the key pair generation utility 712, which is also executing in the cloud. The key pair generation utility generates the SSH key pair, stores the public key and, at step 6, returns the private key back to the user's browser to complete the process. Thus, as compared to the FIG. 6 embodiment, the key generation takes place within the cloud provider, although still within the F-SSO operation flow itself.

Some protocols, such as CIFS, do not support key pairs but, rather, require username and password (U/P) for authentication. In this case, according to the techniques described herein, the SAML assertion may include the U/P, or it may include just the username, and in either case the cloud provider then presents the user with a simple interaction to establish a cloud-side password for subsequent access to services. In particular, it is assumed that the cloud provider has a directory service, such as LDAP, Active Directory, or the like. Upon registration, the user has an account created at the cloud provider directory, and that account is marked as a "local authentication" user. The user's cloud-side password will be managed by this directory. For protocols where a U/P is collected at the cloud provider side and then verified against the customer LDAP, F-SSO functionality is used to establish the user as a "bona fide" user, optionally to help collect a password for the user, and then to complete the U/P validation at the customer side (e.g., using F-SSO with a secure message exchange protocol such as WS-Trust).

Figure 8:
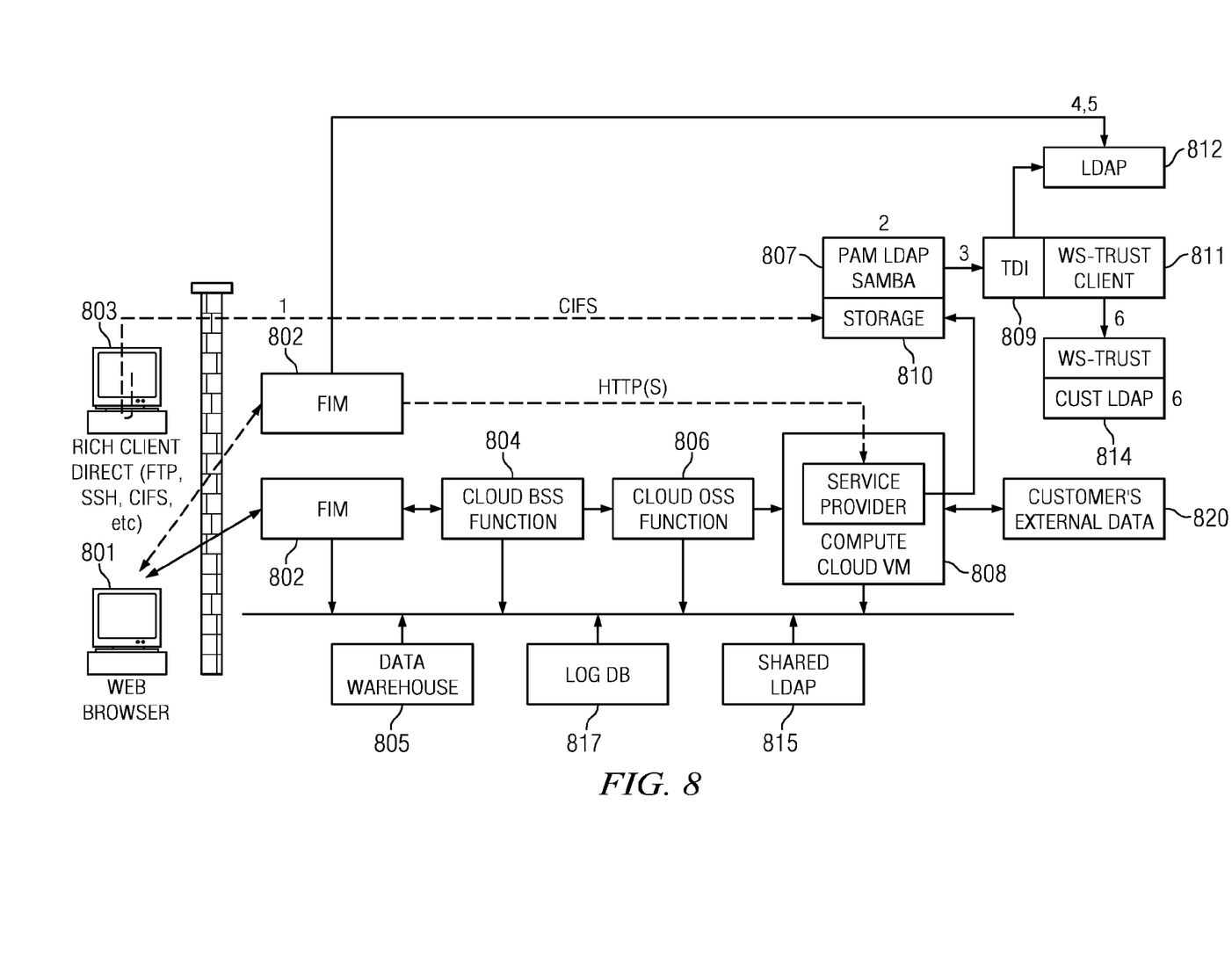
FIG. 8 illustrates an embodiment of the described invention for use with a storage protocol, such as CIFS.

FIG. 8 illustrates a representative CIFS embodiment. In this embodiment, the cloud provider 800 comprises a set of common management platform components. These components include one or more instances of the identity manager 802, the cloud BSS function 804, and the cloud OSS function 806, all of which were described above with respect to FIG. 4. The compute cloud 808 comprises the virtual machine instances that provide the computing infrastructure, and in this example (using CIFS) the target application uses storage 810. In this example, the set of common management platform components also comprise a pam_ldap module 807, which provides a means for Linux or Solaris servers and workstations to authenticate against LDAP directories, a directory integrator module (TDI) 809 that transforms and synchronizes identity data residing in heterogeneous directories, databases, files, collaborative systems and applications, a LDAP directory service 812, and a security token service (not shown). The security token service uses secure messaging mechanisms of Web Services Trust (WS-Trust) to define additional extensions for the issuance, exchange, and validation of security tokens. WS-Trust is an OASIS standard that enables security token interoperability by defining a request/response protocol. The WS-Trust protocol allows a Web service client to request of some trusted authority that a particular security token be exchange for another. To that end, a WS-Trust client 811 forms part of the common management and interfaces to a customer's LDAP 814 (through a customer side WS-Trust client) as shown. The customer's external data is supported in database 820. The common management platform also includes data warehouse 805, log database 817, and a shared LDAP 815. Client access is provided via a web browser 801 or via a "rich" client, i.e. a machine supporting a direct access client such as CIFS (or the like). As shown, normally the identity manager component 802 interfaces to the cloud computing infrastructure via secure HTTP, while normally the rich client interfaces to the storage 810 via CIFS. Despite this "air gap" between protocols, the subject disclosure uses F-SSO to enable these protocols to work together to facilitate user authentication to the cloud provider, as now described.

For those users who will have a U/P managed by the cloud provider 800, their F-SSO SAML assertion may include the U/P, or it may include a username only; in either case, the cloud provider presents the user with a simple interaction to establish a cloud-side password for access to cloud services. The user then has an account created at the cloud LDAP 812, and that account is marked as a "local authentication" user, and the user's password also is managed by LDAP. When the user attempts to access the storage 810, the pam_ldap module 807 intercepts the U/P and attempts to validate them. In this approach, a proxy (such as TDI 809) is the recipient of this U/P validation request. The proxy will first establish if this is a local user (and thus authenticates locally); if so, the proxy attempts to validate the U/P against the local LDAP 812. If the user is not a "local" user, however, the proxy generates a WS-Trust request and, using WS-Trust client 811, requests validation of the user's password from the user's identity provider (customer LDAP 814). In this approach, it is not required that the cloud provider manages a user's password, but it is still possible to do this for those customers that do not wish to establish a full proxy solution. In the above example, the use of WS-Trust is merely representative.

In both examples (SSH and CIFS) described and illustrated above, the user originally "registers" to the cloud provider using an HTTP-based F-SSO protocol, such as SAML, while still preserving the ability of the user to use non-HTTP based file and storage protocols in a seamless fashion. This approach allows for all of the advantages of the F-SSO protocol, including lifecycle management. As part of the user's initial registration, the cloud provider may be provided with attributes about the user, such as which projects he or she is involved with, how long he or she is authorized to have access (e.g., 6 months, until project B is cancelled, etc.) and so on. This approach enables the cloud provider to set up and manage access control enforcement points based on policy information that is established by the cloud customer. In this scenario, the cloud provider provides a management portal (e.g., a secure extranet application) by which customers can register and manage the groups and attributes that are required for policy decisions and enforcement. For example, the customer can create a group "test product B" and assign this group to a validity period (e.g. from "Jan. 1 to Mar. 31, 2010"). Thus, all users who are in this group will be able to access a set of images used for testing of product B between these dates, but not before or after.

To accommodate an arbitrarily complex set of business relationships between the F-SSO provider, partners, resellers and end users, including administrative boundaries within each organization, preferably the F-SSO LDAP system 812 is structured to reflect the nature of this complex of relationships. This allows each individual context within the directory to act as a repository for information about a particular organizational unit. This content-specific information includes, as appropriate, full authoritative status and credentials of each user, or information pointing to an external identity provider that holds that information, or a combination of both.

Preferably, where keys are used for authentication, all key management is handled by a user's identity provider. The cloud provider is responsible for checking keys for validity. If the keys have expired, or if the cloud provider has any reason to believe that the keys may no longer be valid, the provider has the responsibility to force the user into an F-SSO request to re-establish keys. This can be handled by simply refusing to authenticate the user and giving him/her an error message that tells the user to do an F-SSO. A more sophisticated alternative is to automatically notify the user via an e-mail that contains a link that triggers the F-SSO and key re-validation.

The techniques described herein have many advantages. Foremost, F-SSO protocol flows, such as SAML, provide a complete user lifecycle management solution, because the user is always completely managed from a lifecycle point of view by the identity provider, and because all user access happens over a single protocol (HTTP). The scenarios described herein enable seamless use of disparate protocols (HTTP and SSH, HTTP and CIFS, etc.) to facilitate cloud authentication (and thus access to cloud resources). In some cases, the cloud provider maintains enough information (e.g., the SSH keys, or at least the public key) about a user so that the cloud provider does not need to always return the user to his or her identity provider for F-SSO purposes.

Any federated lifecycle management techniques can be implemented. Several are now briefly described merely for illustrative purposes.

An identity provider may use a WS-Provisioning flow to send information to the cloud provider in real-time so that a user can be appropriately disabled at the cloud provider. This lifecycle management function can be done with the granularity of the username, or it can be done at the granularity of the user's SSH keys (and, as such, becomes analogous to a certificate revocation list (CRL) that is periodically updated at the cloud provider).

As another lifecycle management variant, a CRL-like approach also can be implemented by having the cloud provider do a period request to the identity provider for a new CRL list, or by having an additional cloud service to which the identity provider (in real-time or near real-time) will update a CRL-like "valid SSH key" list. The cloud provider (in real-time, near real-time, or periodically) then uses this list for authenticating the identity provider's users.

As yet another lifecycle variant, if there is sufficient bandwidth, the cloud provider may do a WS-Trust call to the identity provider to validate the user's SSH keys, giving the identity provider the ability to guarantee a "real-time" shutoff of a user. In such case, the identity provider is the responsible party for denying the user's access as it has absolute control over the validity of the SSH keys as understood by the cloud provider.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

As the above examples illustrate, one or more of the F-SSO functions may be hosted within or external to the cloud.

Still more generally, the subject matter described herein can take the form of an entirely hardware embodiment, an entirely software embodiment or an embodiment containing both hardware and software elements. In a preferred embodiment, the layered logout function is implemented in software, which includes but is not limited to firmware, resident software, microcode, and the like. The data (e.g., SSH keys, CFIS U/P, and the like) can be configured into a data structure (e.g., an array, a linked list, etc.) and stored in a data store, such as computer memory. Furthermore, as noted above, the enhanced F-SSO functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the enhanced F-SSO components are implemented in a special purpose computer, preferably in software executed by one or more processors. The associated configuration (security levels, status, timers) is stored in an associated data store. The software also is maintained in one or more data stores or memories associated with the one or more processors, and the software may be implemented as one or more computer programs.

The enhanced F-SSO function may be implemented as an adjunct or extension to an existing access manager or policy management solution.

As noted above, although SAML has been described as the preferred assertion format, this is not a limitation, as other techniques (e.g., attribute certificates) for providing the authentication data may be used.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

The invention claimed is:

1. A method to manage access to resources hosted in a shared pool of configurable computing resources, comprising:
    receiving a registration request to initiate a user's registration to use resources hosted in the shared pool of configurable computing resources;
    during a registration process initiated by receipt of the registration request, receiving a federated single sign-on (F-SSO) request, the F-SSO request having an assertion associated therewith that includes authentication data for use to enable direct user access to a resource hosted in the shared pool of configurable computing resources;
    attempting to validate the assertion using a software component executing on a hardware element;
    upon validation of the assertion, deploying the authentication data within the shared pool of configurable computing resources to enable direct user access to the resource.

2. The method as described in claim 1 wherein the assertion is a Hypertext Transfer Protocol (HTTP)-based Security Assertion Markup Language (SAML) assertion.

3. The method as described in claim 2 wherein the authentication data is a public key of a key pair.

4. The method as described in claim 3 further generating the key pair during the registration process.

5. The method as described in claim 3 wherein the key pair is a key pair associated with a non-HTTP file transfer protocol.

6. The method as described in claim 5 wherein the non-HTTP data transfer protocol is Secure Shell (SSH) or File Transfer Protocol (FTP).

7. The method as described in claim 2 wherein the authentication data includes a username.

8. The method as described in claim 7 wherein the username is associated with a non-HTTP file storage protocol.

9. The method as described in claim 8 wherein the non-HTTP file storage protocol is Common Internet File System (CIFS) or Network File System (NFS).

10. Apparatus to manage access to resources hosted in a shared pool of configurable computing resources, comprising:
    a processor;
    computer memory holding computer program instructions that when executed by the processor perform a method comprising:
        receiving a registration request to initiate a user's registration to use resources hosted in the shared pool of configurable computing resources;
        during a registration process initiated by receipt of the registration request, receiving a federated single sign-on (F-SSO) request, the F-SSO request having an assertion associated therewith that includes authentication data for use to enable direct user access to a resource hosted in the shared pool of configurable computing resources;
        attempting to validate the assertion;
        upon validation of the assertion, deploying the authentication data within the shared pool of configurable computing resources to enable direct user access to the resource.

11. The apparatus as described in claim 10 wherein the assertion is a Hypertext Transfer Protocol (HTTP)-based Security Assertion Markup Language (SAML) assertion.

12. The apparatus as described in claim 11 wherein the authentication data is a public key of a key pair.

13. The apparatus as described in claim 12 wherein the method further generates the key pair during the registration process.

14. The apparatus as described in claim 12 wherein the key pair is a key pair associated with a non-HTTP file transfer protocol.

15. The apparatus as described in claim 14 wherein the non-HTTP data transfer protocol is Secure Shell (SSH) or File Transfer Protocol (FTP).

16. The apparatus as described in claim 11 wherein the authentication data includes a username.

17. The apparatus as described in claim 16 wherein the username is associated with a non-HTTP file storage protocol.

18. The apparatus as described in claim 17 wherein the non-HTTP file storage protocol is Common Internet File System (CIFS) or Network File System (NFS).

19. A computer program product in a non-transitory computer readable storage medium for use in a data processing system to manage access to resources hosted in a shared pool of configurable computing resources, the computer program product holding computer program instructions which, when executed by the data processing system, perform a method comprising:
    receiving a registration request to initiate a user's registration to use resources hosted in the shared pool of configurable computing resources;
    during a registration process initiated by receipt of the registration request, receiving a federated single sign-on (F-SSO) request, the F-SSO request having an assertion associated therewith that includes authentication data for use to enable direct user access to a resource hosted in the shared pool of configurable computing resources;
    attempting to validate the assertion;
    upon validation of the assertion, deploying the authentication data within the shared pool of configurable computing resources to enable direct user access to the resource.

20. The computer program product as described in claim 19 wherein the assertion is a Hypertext Transfer Protocol (HTTP)-based Security Assertion Markup Language (SAML) assertion.

21. The computer program product as described in claim 20 wherein the authentication data is a public key of a key pair.

22. The computer program product as described in claim 21 wherein the method further generates the key pair during the registration process.

23. The computer program product as described in claim 21 wherein the key pair is a key pair associated with a non-HTTP file transfer protocol.

24. The computer program product as described in claim 23 wherein the non-HTTP data transfer protocol is Secure Shell (SSH) or File Transfer Protocol (FTP).

25. The computer program product as described in claim 20 wherein the authentication data includes a username.

26. The computer program product as described in claim 25 wherein the username is associated with a non-HTTP file storage protocol.

27. The computer program product as described in claim 26 wherein the non-HTTP file storage protocol is Common Internet File System (CIFS) or Network File System (NFS).

28. The method as described in claim 1 further including performing an additional lifecycle management operation with respect to the user and the resource after validating the assertion.

29. The apparatus as described in claim 10 wherein the method further includes performing an additional lifecycle management operation with respect to the user and the resource after validating the assertion.

30. The computer program product as described in claim 19 wherein the method further includes performing an additional lifecycle management operation with respect to the user and the resource after validating the assertion.

31. The method as described in claim 1 wherein the shared pool of configurable resources includes multiple standard protocols for resource access or storage, and wherein the method further includes provisioning a credential to at least one other resource in the shared pool using one of the multiple standard protocols.

32. The apparatus as described in claim 10 wherein the shared pool of configurable resources includes multiple standard protocols for resource access or storage, and wherein the method further includes provisioning a credential to at least one other resource in the shared pool using one of the multiple standard protocols.

33. The computer program product as described in claim 19 wherein the shared pool of configurable resources includes multiple standard protocols for resource access or storage, and wherein the method further includes provisioning a credential to at least one other resource in the shared pool using one of the multiple standard protocols.

* * * * *